United States Patent
Trakas

(10) Patent No.: US 7,232,307 B2
(45) Date of Patent: Jun. 19, 2007

(54) INTERNALLY HEATED NOZZLE FOR CLOSE CAVITY SPACING INJECTION MOLDING APPLICATIONS

(76) Inventor: Panos Trakas, 1769 Whispering Ct., Addison, IL (US) 60101

( * ) Notice: Subject to any disclaimer, the term of this patent is extended or adjusted under 35 U.S.C. 154(b) by 376 days.

(21) Appl. No.: 10/922,392

(22) Filed: Aug. 20, 2004

(65) Prior Publication Data

US 2005/0048161 A1   Mar. 3, 2005

Related U.S. Application Data

(60) Provisional application No. 60/496,936, filed on Aug. 21, 2003.

(51) Int. Cl.
*B29C 45/20* (2006.01)
(52) U.S. Cl. ..................... 425/549
(58) Field of Classification Search ............. 425/549
See application file for complete search history.

(56) References Cited

U.S. PATENT DOCUMENTS

| | | |
|---|---|---|
| 4,558,210 A | 12/1985 | Leary |
| 4,882,469 A | 11/1989 | Trakas |
| 4,899,435 A | 2/1990 | Trakas |
| 4,900,560 A | 2/1990 | Trakas |
| 4,906,360 A | 3/1990 | Trakas |
| 4,988,848 A | 1/1991 | Trakas |
| 5,052,100 A | 10/1991 | Trakas |
| 5,055,028 A | 10/1991 | Trakas |
| 5,098,280 A | 3/1992 | Trakas |
| 5,136,141 A | 8/1992 | Trakas |
| 5,147,663 A | 9/1992 | Trakas |
| 5,180,594 A | 1/1993 | Trakas |
| 6,619,948 B2 * | 9/2003 | Gunther ................ 425/549 |
| 2002/0102322 A1 | 8/2002 | Gunther |
| 2003/0003188 A1 | 1/2003 | Gunther |

FOREIGN PATENT DOCUMENTS

| | | |
|---|---|---|
| DE | 296 10 268 U1 | 10/1996 |
| EP | 028 153 | 5/1991 |
| EP | 0 724 943 B1 | 8/1996 |

* cited by examiner

*Primary Examiner*—Tim Heitbrink
(74) *Attorney, Agent, or Firm*—Cook, Alex, McFarron, Manzo, Cummings & Mehler, Ltd.

(57) ABSTRACT

An internally heated injection molding nozzle has a unitary head portion and body portion. The nozzle has opposed, generally planar, lateral faces and front and back sides. A melt passageway is defined by a bore extending through the head portion and body portion, and a heater core is received in an elongated cavity that is in generally parallel alignment with, and spaced from, the melt passageway.

3 Claims, 2 Drawing Sheets

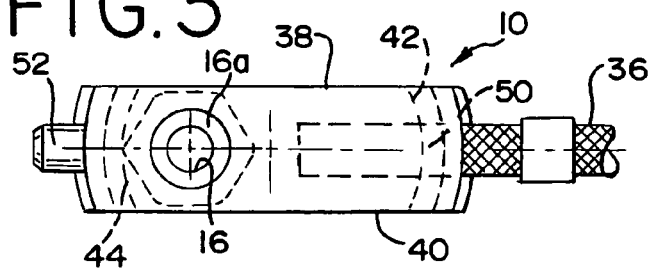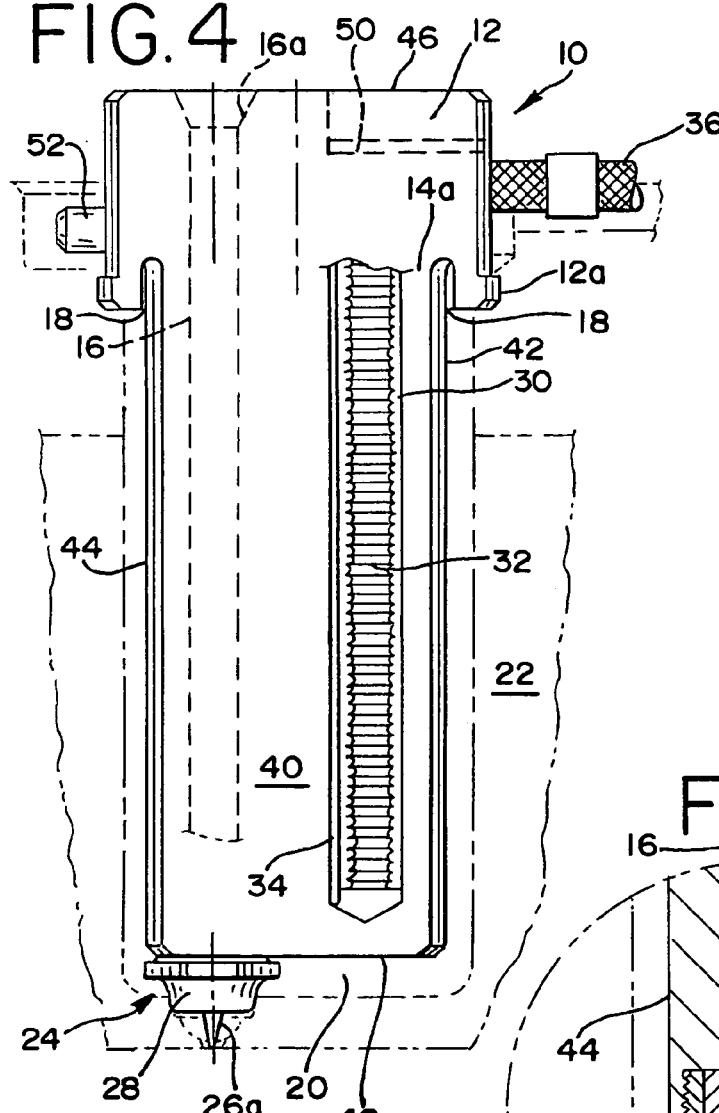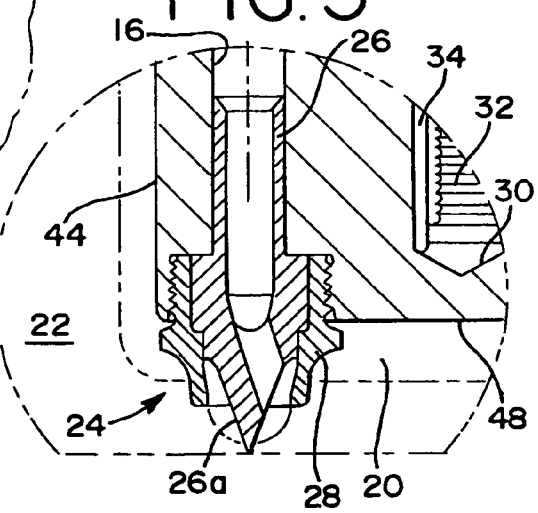

INTERNALLY HEATED NOZZLE FOR CLOSE CAVITY SPACING INJECTION MOLDING APPLICATIONS

CROSS REFERENCE TO RELATED APPLICATION

This application claims the benefit of the filing date of Provisional Application Ser. No. 60/496,936, filed Aug. 21, 2003.

BACKGROUND OF THE INVENTION

The present invention generally relates to internally heated, injection molding nozzles. More particularly, this invention relates to an improved injection molding nozzle wherein a nozzle body, a heater core, and a thermocouple are of an integral, unitary construction, and said heater core and said thermocouple are positioned on one side of, rather than concentrically enclose, a melt duct, thereby allowing opposing lateral surfaces of said nozzle body to be generally flat and generally parallel to one another, resulting in a nozzle that is narrow in width and that is particularly suitable for use in close cavity spacing injection molding applications.

In certain injection molding applications, such as the molding of complex or multiple small parts, it is desirable to arrange the injection molding nozzles as close together as possible in side-by-side relationship. This ensures that the complicated mold cavity can be quickly and completely filled, or that smaller molds may be used when making multiple small parts.

In conventional hot runner injection molding nozzles, the melt passageway is located interior of and concentric with a heater coil. This relationship dictates the width of the nozzle and, consequently how closely adjacent nozzles can be spaced.

Accordingly, it is the object of the present invention to provide a hot runner injection molding nozzle that allows for closer spacing of a plurality of nozzles than can be obtained with presently available nozzles.

SUMMARY OF THE INVENTION

This object, as well as others which will become apparent upon reference to the following detailed description and accompanying drawings, are provided by an internally heated injection molding nozzle having a unitary head portion and body portion with opposed, generally-planar lateral faces and front and back sides. A melt passageway is defined by a bore extending through the head portion and the body portion. A heater core is received in an elongated cavity in generally parallel alignment with and spaced away from the melt passageway. In a preferred embodiment, the distance between the heater the cavity and the back side of the nozzle is less than the distance between the melt passageway and the front side of the nozzle which, in turn, is less than the distance between the melt passageway and the heater cavity.

BRIEF DESCRIPTION OF THE FIGURES OF THE DRAWINGS

The present invention is now described in conjunction with the accompanying drawings and photographs in which like reference numerals designate like parts and wherein:

FIG. 3 is a top plan view of the nozzle of the present invention showing the melt duct inlet in greater detail;

FIG. 4 is a side elevational view of the nozzle shown in FIG. 3, with portions thereof broken away to show detail, in a mold partially shown in schematic form; and FIG. 5 is an enlarged fragmentary view, partially in section, showing the tip portion of the nozzle shown in FIG. 4.

DETAILED DESCRIPTION OF THE PREFERRED EMBODIMENT

Figure 1:
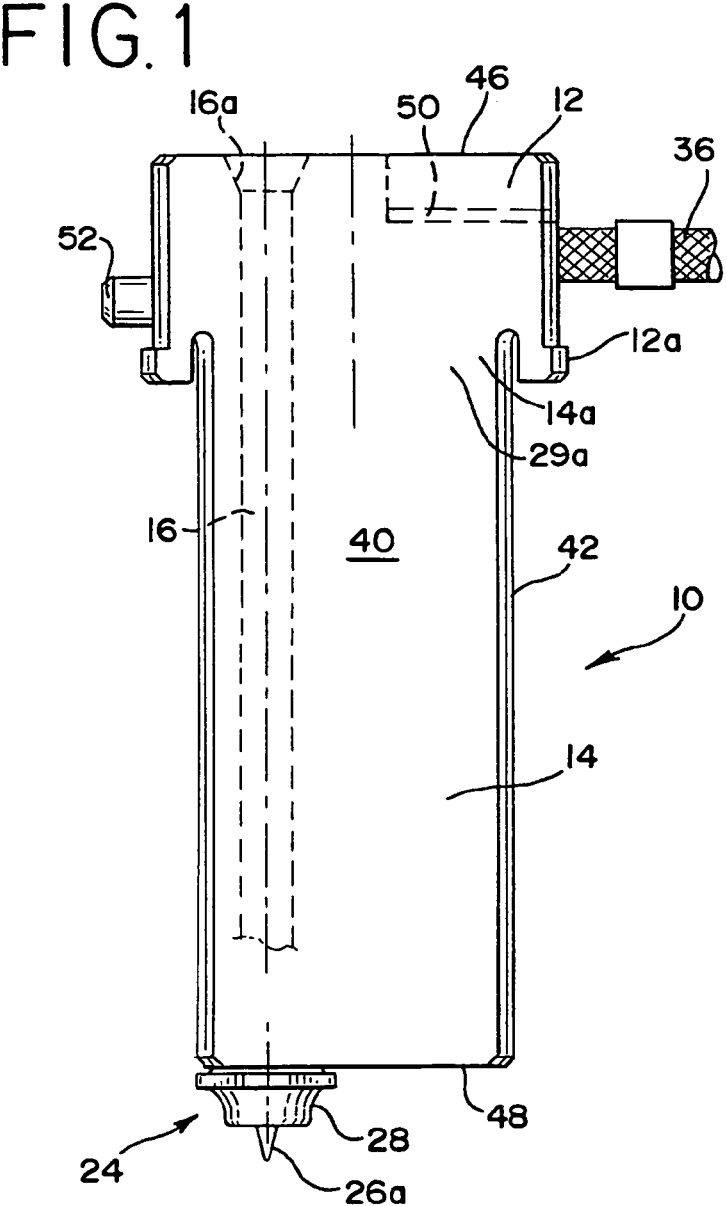
FIG. 1 is a side elevational view, partially in phantom, of the nozzle of the present invention.
Figure 2:
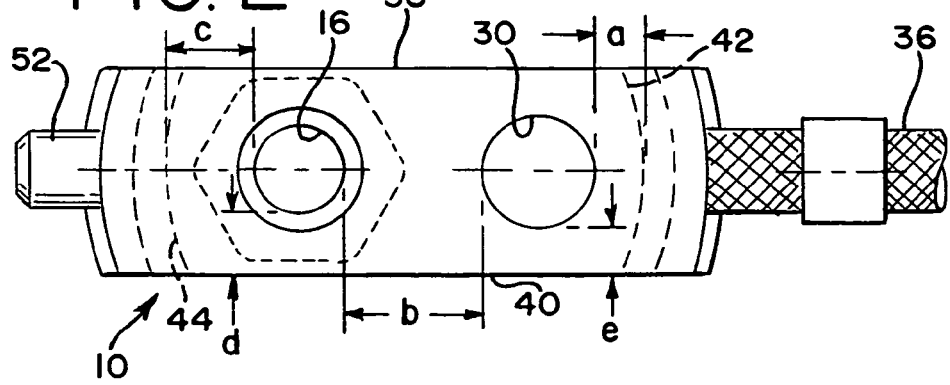
FIG. 2 is a top plan view of the nozzle of FIG. 1.

As shown in the drawings and, with particular reference to FIG. 2, the nozzle of the present invention is generally designated by the reference number 10 and includes a head portion 12 and body portion 14. A melt duct 16 having a melt inlet 16a extends through the head 12 and body 14 of the nozzle. As best shown in FIGS. 1 and 4, the lower portion 12a of nozzle head 12 is spaced away in surrounding relation to the upper most portion 14a of the nozzle body 14 to define a captive insulative air space 18.

An insulative air space 20 (FIGS. 4 and 5) surrounds the nozzle body and functions to minimize heat transfer between the heated nozzle and the cooled mold 22. In the illustrated embodiment (FIG. 5), nozzle tip component 24 is shown and includes a hollow inner piece 26 having a tip 26a and a hollow outer piece 28. It will be appreciated that other variations and configurations and types of nozzle tip components will be apparent to those skilled in the art.

Nozzle 10 includes a heater cavity 30 in which a heater core 32 and thermocouple 34 are located. As described in U.S. Pat. No. 5,055,028, the disclosure of which is incorporated herein by reference, the volume of the cavity not occupied by the thermocouple and the heater core is filled with a substantially void free, compacted particulate ceramic refractory material such as, for example, magnesium oxide. As described in that patent, the ceramic refractory material of choice, magnesium oxide, provides excellent heat transfer capabilities at high temperatures when it is compacted. After the heater core 32, thermocouple 34 and ceramic refractory material are inserted into the heater cavity 30, the nozzle is subjected to a swaging process.

As is known in the art, a thermocouple and electrical in/out connectors (not shown) are provided in the nozzle head 12. The connectors communicate with appropriate thermocouple and electrical insulated leads which are contained within a sheathed cable 36.

Referring to FIG. 2, the reference numerals 38 and 40 respectively designate first and second lateral sides or faces of the nozzle 10. The opposing lateral faces 38 and 40 of the nozzle are generally flat and generally parallel to one another. In the illustrated embodiment, the nozzle also includes an arcuate back side 42, an arcuate front side 44, a top, flat end face 46, and bottom, flat end face 48. In accordance with an aspect of the present invention, all of the surfaces of the nozzle head 12 and nozzle body 14, are of an integral, unitary, seamless construction, except for a metal cover plate 50 that seals the heater cavity and an access slot above the cover plate that is filled with metal. The cover plate 50 is attached to the nozzle by, e.g., welding and the access slot filled with molten metal. Then the entire nozzle is machined to shape and polished to give it a seamless appearance. As shown in FIGS. 1-4, a dowel pin 52 is provided to position and stabilize the nozzle in a mold.

The locations of the heater core and melt duct relative to the associated portions of the surfaces of the nozzle body are an aspect of the present invention. As shown in FIG. 2, letters designating particular dimensions are as follows:

| | |
|---|---|
| a | Distance between wall of heater cavity 30 and surface of back side 42 |
| b | Distance between wall of melt duct 16 and surface of heater cavity 30 |
| c | Distance between wall of melt duct 16 and surface of front side 44 of nozzle body |
| d | Distance between lateral faces 38 and 40 of the melt duct 16 |
| e | Distance between lateral faces 38 and 40 and heater cavity 30 |

Referring to FIG. 2, in the illustrated embodiment, it will be noted that dimension "a" is generally less than dimension "c" which is generally less than dimension "b." In one example, a=0.115 in., b=0.339 in., c=0.219 in., d=0.151 in., and e=0.113 in. While specific dimensions have been given, it will be appreciated that these dimensions can vary depending on the overall size of the nozzle and the operating parameters of the molding application in which the nozzle is to be used.

It will be understood that the herein described embodiment of the present invention is merely illustrative and that modifications and variations may be made by those skilled in the art without departing from the spirit and scope of this invention.

What is claimed:

1. An internally heated injection molding nozzle comprising:
    a unitary head portion and body portion having opposed, generally planar, lateral faces and front and back sides;
    a melt passageway defined by a bore extending through the head portion and body portion;
    a heater core received in an elongated cavity in the head portion and body portion in generally parallel alignment with and spaced away from the melt passageway; and
    the head portion and body portion and heater core being of integral construction.

2. The nozzle of claim 1 wherein the nozzle defines distances a, b and c, with a=the distance between the heater cavity and the back side of the nozzle, b=the distance between the melt passageway and the heater cavity, and c=the distance between the melt passageway and the front side of the nozzle, such that a<c<b.

3. The nozzle of claim 2 wherein a=0.115 in, b=0339 in, and c=0.219 in.

* * * * *